United States Patent Office 2,840,484
Patented June 24, 1958

2,840,484

PROCESS FOR PLASTIFYING CELLULOSE-DERIVATIVES

René Camille Gerbaux, Edegem-Antwerp, Belgium, assignor to Gevaert Photo-Producten N. V., Mortsel-Antwerp, Belgium, a Belgian company No Drawing. Application July 5, 1955
Serial No. 520,111

Claims priority, application Netherlands July 7, 1954

4 Claims. (Cl. 106—178)

The present invention relates to a process for plasticizing cellulose derivatives by means of aromatic carbamate compounds.

It is generally known to add substances to cellulose-ester solutions from which threads, foils and films are manufactured, in order to improve the mechanical properties of the end product. Thus, esters and ethers of monovalent and polyvalent alcohols, of saturated and unsaturated fatty acids, of aromatic acids and phosphoric acid are generally known as plasticizers for cellulose compounds. Among the nitrogen-containing compounds, amides, anilides and certain derivates of urea and carbamic acid are known as additives to cellulose derivatives.

Known as plasticizers are carbamates corresponding to the general formula

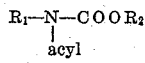

$$R_1 - N - COOR_2$$
$$|$$
$$acyl$$

wherein at least $R_1$ or $R_2$ represents alkyl- or cycloalkyl; likewise esters of amino acids wherein the carboxyl group and the nitrogen bear aliphatic, arylaliphatic or aromatic groups.

Especially for cellulose derivatives, for example, cellulose acetate, it is known to use as plasticizers N-alkyl-substituted lower aliphatic esters of carbamic acid, or aliphatic and alicyclic esters of carbamic acid wherein the nitrogen bears alkyl, aryl, aralkyl or alicyclic groups.

It is an object of my present invention to use new plasticizers with cellulose derivatives which yield a composition with improved properties.

A further object of my invention consists in manufacturing clear transparent films from cellulose derivatives with improved dimensional stability.

Other objects will appear from the following description.

I have found that the addition to solutions of cellulose-derivatives of nitrogen-substituted carbamates of the general formula

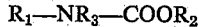

$$R_1 - NR_3 - COOR_2$$

wherein $R_1$ and $R_2$ represent a phenyl- or benzyl radical which may be substituted in the phenyl nuclei by chlorine, fluorine or lower alkyl radicals and $R_3$ represents H, $CH_3$ or $C_2H_5$ confer particular properties upon the end products made from these solutions.

The hydrogen atoms of the phenyl nuclei in the carbamate may further be substituted by chlorine or fluorine atoms or by lower alkyl radicals whereby the compatibility with certain cellulose derivatives is adjusted and the inflammability may be reduced.

The carbamates of my present invention may be prepared according to known methods, for instance, by the interaction of benzyl- or phenyl-isocyanate upon phenol or benzyl alcohol with or without a catalyst, occasionally in the presence of inert solvents, or such solvents as promote the condensation. N-alkyl-N-phenyl- or N-alkyl-N-benzyl carbamyl chloride may also be caused to react upon sodium phenolate or sodium benzyl alcoholate. These carbamyl chloride compounds may likewise be caused to react upon phenol or benzyl alcohol, optionally in the presence of an acidifying reagent. The preparation may also be effected by reaction of chloro-carbonates upon aniline or benzylamine or their mono-alkyl nitrogen substituted derivatives.

As cellulose derivatives, cellulose esters of lower fatty acids and cellulose ethers such as benzyl cellulose and ethyl cellulose may be used. Since the aryl-carbamates dissolve in the solvents for cellulose triacetate or cellulose esters of lower fatty acids, they are of particular importance for the preparation of solutions from which threads and films may be manufactured. On account of their excellent properties, these films may be used as a base for photographic film.

The carbamates according to my present invention are added to the cellulose derivative-solutions in quantities of 5 to 35% by weight calculated upon the cellulose derivative.

The improvement of the films from cellulose acetate which contain aryl-carbamates according to the present invention mainly consists in an increased elasticity, in a lower water-sensitivity and in an increased stability of the properties of the film.

It is noteworthy that the structure of the new carbamates shows great conformity with those of the cellulose chain. Thus, these carbamates possess a linear and planar structure. This conformity in structure further requires the presence of two aromatic nuclei in the molecule. Indeed, it is known that the glucopyranose nucleus in the cellulose chain is more like a phenyl nucleus than like a cyclo-hexane ring. It is perhaps in this conformity that an explanation may be found for the excellent plasticizing properties for the cellulose derivatives obtained by my invention. Moreover, the carbamate group offers the possibility of forming by polarity or by hydrogen binding bonds with the cellulose chains.

The special properties of the plasticizers according to my invention are further illustrated by the following example to which, however, the invention is not limited in any way.

EXAMPLE

To a cellulose triacetate solution in a mixture of 85 vol. percent methylene chloride and 15 vol. percent ethanol with a viscosity of 22,000 cps., the desired quantity of plasticizer is added (calculated in percentage by weight in proportion to the cellulose derivative). Films are cast herefrom upon a glass plate such that the thickness of the film finally obtained after evaporation of the solvents in all cases is equal to 0.012 cm.

Benzyl-N, -phenylcarbamate and phenyl-N-phenylcarbamate are examples of plasticizers according to my present invention. They are compared with triphenyl phosphate. Further are cited examples of carbamates which in structure correspond with plasticizers known before, or systematically deviate from the structure of the carbamates according to my present invention, including ethyl-N-diethyl carbamate, ethyl-N-phenylcarbamate, butyl-N-phenylcarbamate, cyclohexyl-N-phenylcarbamate, diethyl-N-N'-m-toluylene-dicarbamate, and dibenzyl-N-N'-m-toluylenedicarbamate. It appeared from experiments with higher aliphatic carbamates, for instance cetyl-N-phenylcarbamate, that cellulose acetate with this plasticizer yields untransparent films. For this reason, further experiments were not made therewith.

The results of comparative tests are given in the following table:

Table I

| Properties Plasticizer, 15% | Resistance to elongation (kg./mm.²) | Elongation | Limit of elasticity (kg./mm.²) |
|---|---|---|---|
| Benzyl-N-phenyl-carbamate | 11.8 | 27.7 | 9.6 |
| Phenyl-N-phenyl-carbamate | 11.7 | 22.8 | 10.2 |
| Triphenyl phosphate | 11.6 | 23 | 9.3 |
| Diethyl-N-N'-m. toluylene dicarbamate | 10.9 | 20.3 | 9.7 |
| Dibenzyl-N-N'-m. toluylene dicarbamate | 10.6 | 14.5 | 10.2 |
| Cyclohexyl-N-phenyl-carbamate | 8.9 | 20.5 | 7.5 |
| Butyl-N-phenyl-carbamate | 9.6 | 22.0 | 7.6 |
| Ethyl-N-diethyl-carbamate | 9.9 | 20.3 | 7.7 |

It will be seen from this table that the cellulose acetate films which contain symmetrical aryl-carbamates according to the present invention, may well be compared with those containing the usual triphenyl phosphate plasticizer.

It further appears that the carbamate plasticizers according to my present invention are better than the other aromatic plasticizers which deviate from the structure of the cellulose chain.

The elasticity modulus of films with increasing quantity of plasticizer was determined by dynamic measurements according to the vibration method (Table II). The value of $tg\delta$ is a measure of the phase displacement between stress and strain, and thus a measure of the plasticization. It will be seen that the elasticity modulus for the aromatic carbamates not only is higher than that for triphenyl phosphate, but also that this elasticity modulus remains constant at increasing quantities of plasticizer, whereas for triphenyl phosphate it decreases.

It also will be seen that this higher value of the elasticity modulus is attended with an improvement of the plasticizing properties.

Table II

| Content of plasticizer | 5% | | 10% | | 15% | | 20% | | 25% | |
|---|---|---|---|---|---|---|---|---|---|---|
| Plasticizer | el. mod. | $tg\delta$ | el. mod. | $tg\delta$ | el. mod. | $tg\delta$ | el. mod. | $tg\delta$ | el. mod. | $tg\delta$ |
| Triphenylphosphate | 520 | 0.015 | 500 | 0.017 | 495 | 0.018 | | | 435 | 0.025 |
| Benzyl-N-phenylcarbamate | 535 | 0.020 | 540 | 0.025 | 535 | 0.028 | 537 | 0.033 | | |
| Phenyl-N-phenylcarbamate | | | | | 540 | 0.027 | | | | |
| Cyclohexyl-N-phenylcarbamate | | | | | 460 | 0.026 | | | | |
| Butyl-N-phenylcarbamate | | | | | 485 | 0.032 | | | | |
| Ethyl-N-phenylcarbamate | | | | | 500 | 0.031 | | | 485 | 0.037 |
| Ethyl-diethylcarbamate | | | | | 500 | 0.021 | | | | |

As regards water absorption, the quantity of water (expressed in percent), taken up by the films after 24 hours' contact, is given in the following Table III:

Table III

| Content of plasticizer | 5% | 10% | 15% | 20% | 25% |
|---|---|---|---|---|---|
| Plasticizer | | | | | |
| Triphenylphosphate | 6.9 | 6 | 5.3 | | 4.2 |
| Benzyl-N-phenylcarbamate | 6.8 | 5.1 | 4.2 | 3.5 | |
| Phenyl-N-phenylcarbamate | | | 4.3 | | |
| Cyclohexyl-N-phenylcarbamate | | | 4.6 | | |
| Butyl-N-phenylcarbamate | | | 4.4 | | |
| Ethyl-diethyl-carbamate | | | 4.6 | | |

The improvement obtained by the use of carbamates according to my present invention is clearly shown therein.

The following extraction experiments were carried out in order to show the bonding between the cellulose triacetate molecules and plasticizer. Two film strips with 15% plasticizer cast under the same circumstances, were immersed at room temperature into a large excess of ether (500 ml. for a strip of 20 x 3 cm.) and the quantity of extracted plasticizer was determined. The following Table IV gives the quantity of extracted plasticizer as a function of the time and expressed in percent of the total quantity of dry substances.

Table IV

| Duration of the extraction Plasticizer | 1 hr. | 2 hr. | 4 hr. | 6 hr. | 10 hr. |
|---|---|---|---|---|---|
| Triphenyl-phosphate | 3.02 | 4 | 5.65 | 7.1 | 10 |
| Benzyl-N-phenylcarbamate | 1.61 | 2.43 | 4.55 | 6.25 | 10 |

Since the solubility of the carbamates in ether is the same as that of triphenylphosphate, it may immediately be concluded from these figures that the stability of the bonds between the carbamate plasticizer and the cellulose molecule leads to a higher stability of the properties of the film prepared therewith.

All these results clearly prove that the carbamates corresponding to the required structure according to my present invention, as plasticizers for cellulose derivatives, exert a favorable influence upon the properties of films or threads made from cellulose derivatives.

I claim:

1. A composition of matter consisting of cellulose ester of a lower fatty acid and from 5 to 35% by weight of the cellulose ester of an N-substituted carbamate of the formula $$R_1-NR_3-COOR_2$$

wherein $R_1$ and $R_2$ represent aryl groups selected from the group consisting of phenyl, benzyl, and phenyl and benzyl substituted in the phenyl nucleus by a member of the group consisting of chlorine, fluorine and lower alkyl radicals, and $R_3$ represents a member selected from the group consisting of hydrogen, methyl and ethyl.

2. A composition of matter consisting of a cellulose triacetate and from 5 to 35% by weight of the cellulose acetate of a plasticizer selected from the group consisting of phenyl-N-phenyl-carbamate and benzyl-N-phenyl-carbamate.

3. A composition of matter consisting of a cellulose acetate containing from 40 to 44.8% acetyl groups and from 10 to 20% by weight of the cellulose acetate of phenyl-N-phenyl-carbamate.

4. Photographic film base consisting of cellulose triacetate plasticized with 15% by weight of the cellulose acetate of an N-substituted carbamate of the formula $$R_1-NH-COOR_2$$

wherein $R_1$ and $R_2$ represent aryl groups selected from the group consisting of phenyl, benzyl, and phenyl and benzyl substituted in the phenyl nucleus by a member of the group consisting of chlorine, fluorine and lower alkyl radicals.

References Cited in the file of this patent
UNITED STATES PATENTS 2,041,733    Werntz _____ May 26, 1936

OTHER REFERENCES

From et al.: Ber. Deut. Chem. Ges. 56B, 948–953 (1923).